US012631441B2

(12) United States Patent
Wang et al.

(10) Patent No.: US 12,631,441 B2
(45) Date of Patent: May 19, 2026

(54) METHOD AND DEVICE FOR RAPIDLY MEASURING THE TRANSFER MATRIX OF ULTRA-LONG DISTANCE FIBER

(71) Applicant: HUAZHONG UNIVERSITY OF SCIENCE AND TECHNOLOGY, Hubei (CN)

(72) Inventors: Jian Wang, Hubei (CN); Yize Liang, Hubei (CN); Ziyi Tang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 106 days.

(21) Appl. No.: 18/915,360

(22) Filed: Oct. 15, 2024

(65) Prior Publication Data

US 2026/0016287 A1     Jan. 15, 2026

(30) Foreign Application Priority Data

Jul. 12, 2024    (CN) .......................... 202410936883.0

(51) Int. Cl.
*G01B 11/16* (2006.01)
*G02B 27/10* (2006.01)
*G02B 27/28* (2006.01)

(52) U.S. Cl.
CPC .............. *G01B 11/16* (2013.01); *G02B 27/10* (2013.01); *G02B 27/28* (2013.01)

(58) Field of Classification Search
CPC ........ G01B 11/16; G02B 27/10; G02B 27/28; H04B 10/0731; G01M 11/331
See application file for complete search history.

(56) References Cited

U.S. PATENT DOCUMENTS

| | | | |
|---|---|---|---|
| 8,965,217 B2 * | 2/2015 | Nolan | H04B 10/0795 398/143 |
| 2017/0026095 A1 * | 1/2017 | Ashrafi | H04B 7/10 |

* cited by examiner

*Primary Examiner* — Seung C Sohn
(74) *Attorney, Agent, or Firm* — JCIPRNET

(57) ABSTRACT

Disclosed is a method and a device for rapidly measuring the transmission matrix of an ultra-long optical fiber, belonging to the field of information optics. The solution couples the spatial mode into ultra-long few-mode/multi-mode optical fiber for transmission. By obtaining the common path reference light at the output end of the ultra-long few-mode/multi-mode optical fiber and interfering with the signal light at the output end, the complex amplitude distribution of the signal light field output by the optical fiber is reconstructed, weight coefficients of different modes are obtained by performing overlapping integral on the complex amplitude distribution and the ideal complex amplitude distribution of different spatial modes. The transmission matrix of the ultra-long few-mode/multi-mode optical fiber can be obtained by rapidly switching the mode incident into the ultra-long few-mode/multi-mode optical fiber and sequentially calculating the weight coefficients of the different modes at the output end.

8 Claims, 11 Drawing Sheets

METHOD AND DEVICE FOR RAPIDLY MEASURING THE TRANSFER MATRIX OF ULTRA-LONG DISTANCE FIBER

CROSS-REFERENCE TO RELATED APPLICATION

This application claims the priority benefit of China application serial no. 202410936883.0, filed on Jul. 12, 2024. The entirety of the above-mentioned patent application is hereby incorporated by reference herein and made a part of this specification.

BACKGROUND

Technical Field

The disclosure belongs to the field of information optics, and more specifically, relates to a method and a device of rapid measurement of an ultra-long distance optical fiber transmission matrix.

Description of Related Art

In recent years, the mode division multiplexing technology loading different signals on different spatial modes in few-mode/multi-mode optical fiber has greatly improved the communication capacity limit within a single optical fiber and promoted the further development of the field of optical fiber communication. Compared with the conventional single-mode optical fiber communication system, such mode division multiplexing communication technology based on few-mode/multi-mode optical fiber is limited by the mode crosstalk problem existing in the transmission of different spatial modes in few-mode/multi-mode optical fiber. That is, the input spatial mode couples with other modes after being transmitted through long-distance few-mode/multi-mode optical fiber, causing the light beam reaching the receiving end to be a superimposed state of multiple modes rather than the input spatial mode, and thus bit errors at the receiving end are caused. Therefore, rapid measurement of the crosstalk matrix of few-mode/multi-mode optical fiber to characterize the power weight which describes how much specific input spatial modes are coupled into different output modes, is of great significance for mode division multiplexing communication applications based on few-mode/multi-mode optical fiber. Based on the measured mode crosstalk matrix of few-mode/multi-mode optical fiber, the coupling and evolution of spatial modes in optical fiber is clearly understood, mode crosstalk compensation in few-mode/multi-mode optical fiber could be realized, and the communication performance of optical fiber mode division multiplexing communication system could be improved.

To date, many techniques have been developed to achieve mode crosstalk matrix measurement in few-mode/multi-mode optical fibers, for example, there are methods for demodulating the fiber output mode using a demodulation hologram at the output end, measurement methods based on the rotational Doppler effect, and mode crosstalk matrix measurement methods based on a complex amplitude reconstruction algorithm. Among the methods, the method for demodulating the optical fiber output mode using the demodulation hologram at the output end requires demodulating the output end modes one by one, and requires N×N measurements for measuring the N×N mode crosstalk matrix, which has the disadvantage of high complexity. The measurement method based on the rotational Doppler effect has extremely high requirements on the optical path alignment, high system loss, and is easily affected by noise. Compared with the two methods, the mode crosstalk matrix measurement method based on the complex amplitude reconstruction algorithm has the advantages of low complexity (measuring the N×N mode crosstalk matrix only requires N measurements) and simple optical path. Therefore, the method has been widely used in few-mode/multi-mode optical fiber transmission matrix measurement in recent years. Common complex amplitude reconstruction algorithms include phase-shift interferometry complex amplitude reconstruction algorithm based on coaxial interferometry and off-axis digital holography technology based on off-axis interferometry. The former reconstructs the complex amplitude distribution of the light field based on measuring the coaxial interference light fields formed by interfering the signal beam and the reference beam with multiple phase shifts, while the latter reconstructs the complex amplitude information of the light field based on a single off-axis interference hologram between the signal path and the reference path. However, although both interference methods are highly efficient, the methods are also limited by the coherence of the light field: considering that there is a long-distance path mismatch in the signal path after the light beam is transmitted in the long-distance few-mode/multi-mode optical fiber, in order to reconstruct the complex amplitude information of the light field through interference at the receiving end, the laser source needs to have very high coherence property. In 2019, Bell Labs achieved rapid measurement of a 26.5 km multi-mode optical fiber transmission matrix based on a sub-hertz line width laser with good coherence.

However, for actual mode-division multiplexing optical fiber communication systems, it is difficult for the line width of commercial lasers to be below the kHz level. Therefore, the transmission matrix measurement of actual mode-division multiplexing communication systems based on ultra-long distance few-mode/multi-mode optical fiber is difficult to achieve due to such coherence limitations. Therefore, it has become an urgent need to develop a method and a device of rapid measurement of an ultra-long distance optical fiber transmission matrix so that the transmission matrix measurement of few-mode/multi-mode optical fiber is no longer limited by the coherence limitation problem caused by ultra-long distance optical fiber transmission.

SUMMARY

In view of the defects of the related art, the disclosure provides a method and a device of rapid measurement of an ultra-long distance optical fiber transmission matrix. The goal is to obtain a stable and high-performance common path reference light based on the common path reference light obtaining method to achieve high-contrast interference at the output end of the ultra-long distance few-mode/multi-mode optical fiber, and based on the recorded high-contrast interference pattern, the complex amplitude reconstruction of the light field at the output end of the few-mode/multi-mode optical fiber is realized, thereby the transmission matrix of the ultra-long distance few-mode/multi-mode optical fiber is obtained.

To achieve the above purpose, the disclosure provides a method of rapid measurement of an ultra-long distance optical fiber transmission matrix configured to measure transmission matrices of N modes, in which N is a positive integer, and includes the following steps:

Any one of the N modes is used as a tested and input mode, a light beam of the input mode is preprocessed to obtain a reference beam.

In the operation, the preprocessing includes: coupling the light beam into the optical fiber to be measured, and after being transmitted through the optical fiber to be measured, splitting the output light beam of the optical fiber to be measured into two paths, one path being signal light and the other path being reference light; detecting the intensity of the signal light and feeding it back to the reference light; converting the reference light into a reference light with uniform phase, limiting the reference light to a preset polarization, and adjusting the power ratio of the signal light to the reference light according to the intensity of the signal light to ensure interference contrast; combine the reference light and the signal light, the reference light interferes with the signal light, and the obtained interference light is split into two polarized light beams. The two polarized light beams are imaged to obtain a first interference pattern and a second interference pattern, respectively, and the field distribution of the output light field of the light beam is reconstructed based on the first interference pattern and the second interference pattern.

A light beam is sequentially subjected to polarization control and mode control to be controlled into a specific spatial mode which is supported by the optical fiber, and such a specific spatial mode beam transmits through the optical fiber and then be subjected to the preprocessing to obtain field distributions of output light fields of the N−1 modes.

Input a specific spatial mode into optical fiber, weight coefficients of the output N modes are calculated according to the field distributions of the output light fields, that is, one row of the final mode transfer matrix of the optical fiber is characterized. And rapidly switching the input spatial modes, N rows of the transmission matrix of the optical fiber can be obtained.

Considering that a specific spatial mode is coupled into and transferred through the optical fiber, modal crosstalk occurs so that the input spatial mode is converted into a superimposed beam which is superposed by N spatial modes, in which N represents the number of spatial modes supported by the optical fiber. The N×N transfer matrix of an optical fiber is to describe such modal crosstalk. When coupling such a specific spatial mode into optical fiber, the superimposed output light beam is sent to the preprocessing to obtain the complex amplitude distributions of such a superimposed light beam. With the knowledge of the tested complex amplitude distributions, the power coefficients of the N spatial modes can be obtained by calculating the overlapping between the measured complex amplitude distributions and the theoretical complex amplitude distributions of N spatial modes. The measured power coefficients of the N spatial modes is one row of the total transfer matrix of the optical fiber which describes how much input spatial mode couples to other spatial modes. To characterize the phase difference of different rows of the fiber transfer matrix, the fiber input mode is a superimposed beam which is superposed by two spatial modes. Performing preprocessing to this superimposed beam, the field distribution of the output light field of the superimposed beam is obtained. Using the field distribution of the three output light fields of these two beams and their superimposed beam, the phase difference of two rows of the transfer matrix can be calculated. Changing the superimposed beam enables calculating phase difference of different rows of the transfer matrix. Thus, the full transfer matrix of the optical fiber can be characterized.

Optionally, when measuring an ultra-long distance few-mode/multi-mode optical fiber transmission matrix, the selected mode basis is linearly polarized vortex modes, elliptically polarized vortex modes, circularly polarized vortex modes, linear polarization modes, or vector modes. In the process of the optical fiber output end obtaining the distribution of the light field through interference of the signal path and the reference path, a phase-shift interference method or off-axis digital holography technology is adopted.

Optionally, when the phase transmission matrix of an ultra-long distance few-mode/multi-mode optical fiber needs to be measured, a first mode and a second mode may be respectively input into the optical fiber to be measured through polarization control and mode control at the input end, to obtain a first interference light field and a second interference light field at the fiber output end. Afterward, the superimposed state of the first mode and the second mode is input into the optical fiber, and a third interference light field is obtained at the output end of the optical fiber. The global phase difference of the reference light obtained when the first mode and the second mode are input respectively is derived through the first interference light field, the second interference light field, and the third interference light field, thereby the phase transmission matrix of the long-distance optical fiber is obtained.

Optionally, the reference light is converted into a reference light with uniform phase by spatial filtering, and the reference light is limited to a preset polarization, in which the preset polarization is 45°.

Optionally, polarization control is achieved by piezoelectric polarization modulation or electro-optic polarization modulation; mode control is achieved by controlling the two-dimensional phase and amplitude distribution of the light field; the reference light is limited to the preset polarization through piezoelectric control, lithium niobate polarization control, lithium niobate film polarization control, or silicon-based polarization control to achieve tracking and controlling of the polarization state.

The disclosure further provides a device of rapid measurement of an ultra-long distance optical fiber transmission matrix, including: a laser, a control module, a pre-processing module, and a processor.

The control module is used to perform polarization control and mode control on the light beam generated by the laser to obtain specific spatial modes.

The preprocessing module includes an objective lens, an optical fiber to be measured, a beam splitter, a reference light obtaining module, a first power matching module, a reference light obtaining module, a polarization tracking module, a second power matching module, a beam combiner, a polarization beam splitter, and a camera; the light beam is coupled into the optical fiber to be measured through the objective lens and split into two paths by the beam splitter after being transmitted through the optical fiber to be measured, wherein one of the paths is a signal light, and the other one of the paths is a reference light; the first power matching module is configured to detect the intensity of the signal light and feed back to the reference light; the reference light obtaining module is configured to convert the reference light into a reference light with uniform phase, the polarization tracking module is configured to limit the reference light to a preset polarization, and the second power matching module is configured to adjust a power ratio of the signal light to the reference light according to the intensity of the signal light fed back to ensure interference contrast; the reference light and the signal light are combined by the beam combiner, interference occurs, an interference light is obtained, the interference light is split into two paths of polarized light beams by the polarization beam splitter, the two paths of polarized light beams are imaged by the camera to obtain a first interference pattern and a second interference pattern respectively, and the field distribution of the output light field of the light beam is reconstructed based on the first interference pattern and the second interference pattern.

The preprocessing module is configured to use any one of the N spatial modes as the input mode, the light beam of the reference mode is preprocessed to obtain the field distribution of the output light field, and preprocessing is performed on the output light field to obtain the field distributions of output light fields corresponding to the specific spatial mode.

The processor is configured to calculate weight coefficients of the N modes according to the field distributions of the output light fields of the output light field; Once a specific spatial mode is coupled into the optical fiber, the weight coefficients of the N modes are characterized so that one row of the fiber transfer matrix is determined; Rapidly switching the input spatial mode by using the control module, N rows of the transfer matrix of the optical fiber can be finally characterized. To characterize the phase difference of different rows of the fiber transfer matrix, the fiber input mode is a superimposed beam which is superposed by two spatial modes. Performing preprocessing to this superimposed beam, the field distribution of the output light field of the superimposed beam is obtained. Using the field distribution of the three output light fields of these two beams and their superimposed beam, the phase difference of two rows of the transfer matrix can be calculated. Changing the superimposed beam enables calculating phase difference of different rows of the transfer matrix. Thus, the full transfer matrix of the optical fiber can be characterized.

Optionally, the reference light obtaining module is a solution in which a multi-mode optical fiber is connected to a single-mode optical fiber. In the solution, the multi-mode reference light separated by the beam splitter is coupled into the multi-mode optical fiber, and the single-mode optical fiber connected to the multi-mode optical fiber acts as a spatial mode filter to filter the multi-mode reference light into a Gaussian light beam. In order to ensure that the light beam in the multi-mode optical fiber can always be coupled into the single-mode optical fiber, the reference light obtaining module uses a fiber perturbation module to ensure that the optical power in the single-mode optical fiber is not zero by rapid perturbation when no light enters the single-mode optical fiber from the multi-mode optical fiber.

Optionally, the polarization control module is a piezoelectric polarization controller or an electro-optic polarization modulator; the mode control module is a digital micromirror device, a high-speed spatial light modulator, or other high-speed mode modulator; the polarization tracking module is a piezoelectric polarization controller, a lithium niobate polarization modulator, a thin-film lithium niobate polarization modulator, or a silicon-based polarization modulator; the second power matching module is an optical amplifier and a programmable optical attenuator working in the automatically power controlling mode APC.

Optionally, the optical fiber to be measured is solid core few-mode/multi-mode optical fiber, ring core few-mode/multi-mode optical fiber, full-vector multi-mode optical fiber, air core few-mode/multi-mode optical fiber, antiresonant few-mode/multi-mode optical fiber, or photonic bandgap few-mode/multi-mode optical fiber.

Furthermore, the disclosure further provides a mode division multiplexing communication method in the ultra-long distance multi-mode optical fiber. The above method and device can rapidly measure the intensity transmission matrix of the ultra-long distance multi-mode optical fiber, rapidly compensate for the power crosstalk between different modes, and improve the performance of the communication system and reduce the bit error rate of the communication system.

Furthermore, the disclosure further provides an imaging method of the ultra-long distance multi-mode optical fiber. By the intensity transmission matrix and phase transmission matrix of the ultra-long distance multi-mode optical fiber rapidly measured, a mapping relationship between the optical fields of the input end and the output end is established, and then the image of the input end is reconstructed from the complex field of the output; or the cluttered light field calculated by pre-compensation input at the input end of the multi-mode optical fiber is used to obtain the target image output at the output end; or the light beam is converged into a single focus at the output end of the multi-mode optical fiber to achieve endoscopic scanning imaging.

Compared with the related art, the above technical solution conceived by the disclosure can achieve the following beneficial effects:

1. The solution provided by the disclosure breaks the coherence limitation of the measurement of the transmission matrix of few-mode/multi-mode optical fiber, so that the line width requirement of the laser for the measurement of the transmission matrix of few-mode/multi-mode optical fiber is greatly reduced, and also provides a feasible solution for the measurement of the transmission matrix of few-mode/multi-mode optical fiber over ultra-long distance (for example, hundreds of kilometers).

2. Compared with the related art solution of using a single-mode optical fiber of the same length to balance the signal light in a few-mode/multi-mode optical fiber and the reference light in a single-mode optical fiber, the reference light of the disclosure shares a common path with the signal light, and thus the optical path difference between different order modes in the signal light and the reference light is significantly small, which ensures that different order modes can have high-contrast interference with the reference light after ultra-long distance transmission. In the existing single-mode optical fiber balancing technology solution, since different order modes have different effective refractive indices when transmitted in a multi-mode optical fiber, it is impossible to balance all signal light modes with the reference light optical path difference.

3. The disclosure provides a solution to solve the problem of unknown global phase variation of common path reference light by input mode superimposed states, and the solution realizes the measurement of phase transmission matrix of the ultra-long distance few-mode/multi-mode optical fiber, thereby a basis for ultra-long distance optical fiber imaging technology based on provided phase transmission matrix.

4. The disclosure can still realize the measurement of the transmission matrix of the ultra-long distance few-mode/multi-mode optical fiber even when the coherence of the light source is poor, and further can realize the measurement of the transmission matrix of ultra-long distance few-mode/multi-mode optical fiber based on the decoherent light beam loaded with the signal, which enables rapid compensation of mode crosstalk in an ultra-long distance optical fiber mode division multiplexing communication system, thereby the performance of the mode division multiplexing communication system is improved.

DESCRIPTION OF THE EMBODIMENTS

In order to make the purpose, technical solutions, and advantages of the disclosure more comprehensible, the disclosure is further described in detail below together with the accompanying drawings and embodiments. It should be understood that the specific embodiments described herein are only used to explain the disclosure, and the embodiments are not used to limit the disclosure. In addition, the technical features involved in the various embodiments of the disclosure described below may be combined with each other as long as the technical features do not conflict with each other.

Figure 1:
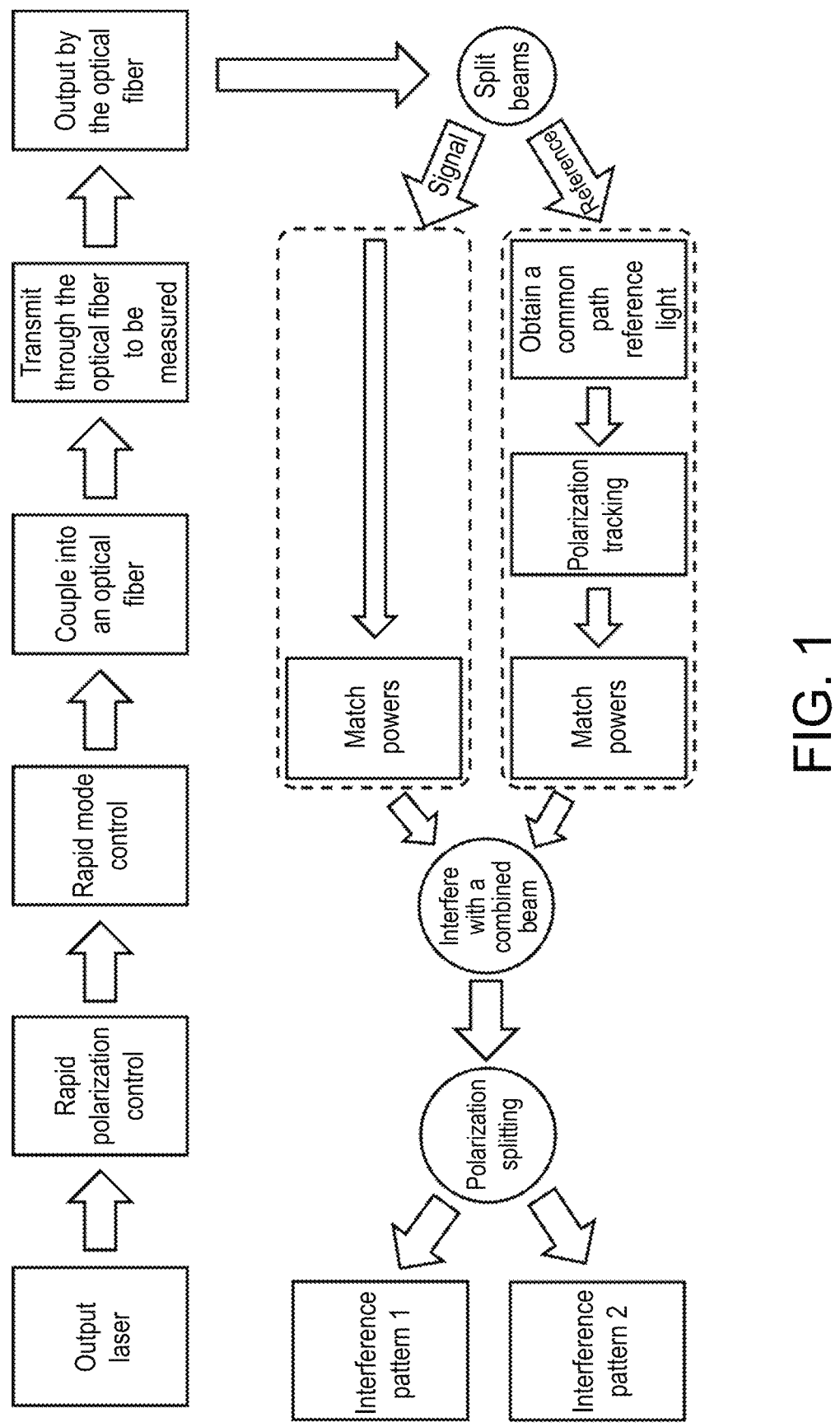
FIG. 1 is a flow chart of a principle of a method of rapid measurement of an ultra-long distance optical fiber transmission matrix provided by the disclosure.

As shown in FIG. 1, which is a flow chart of a principle of a method of rapid measurement of ultra-long distance optical fiber transmission matrix provided by the disclosure, the specific implementation method is as follows:

The incident beam output by the laser is modulated into different modes through rapid polarization control and rapid mode control, and then the different modes are coupled into the optical fiber to be measured. After being transmitted through the optical fiber to be measured, at the output end of the optical fiber to be measured, the output light beam is split into two paths, one path is the signal path, and the other path is the reference path. The two paths of light beams are two paths of light beams transmitted through the same common path of the optical fiber to be measured. In the operation, the signal path is polarization-split into two orthogonal polarization channels, and the reference path converts the mode output by the optical fiber to be measured into a reference light similar to a plane wave and fixes the reference light at a specific polarization state through polarization tracking. A power feedback regulating device is introduced between the signal path and the reference path to match the optical powers of the two paths. The reference path light beam is also polarization-split into two orthogonal polarization channels consistent with the signal light and interferes with the two polarizations of the signal light beam respectively to obtain a polarization pattern 1 and a polarization pattern 2 under the two different polarization channels. After a single mode is input into the optical fiber to be measured, the field distribution of the output light field of the optical fiber to be measured is reconstructed through an interference pattern 1 and an interference pattern 2, and weight coefficients of the different modes at the output end are obtained by overlapping integral with the ideal mode field distribution, that is, $$C_I = \int\int E_S(x, y) \cdot E_I^*(x, y)dxdy, \tag{1}$$

In the equation, $C_I$ is the weight coefficient of the I-th order mode, $E_S(x,y)$ is the complex amplitude distribution of the light field of the signal light reconstructed, $E^*_I(x,y)$ is the complex conjugate of the complex amplitude distribution of the light field of the ideal order mode. By performing overlapping integral on the reconstructed complex amplitude distribution of the light field under the two polarization channels and all the different order modes supported by the optical fiber, the weight coefficients of the output different modes may be obtained. The measured mode weight coefficient is a complex number, the real part thereof corresponds to the power weight of the mode, and the imaginary part thereof corresponds to the global phase of the mode. The initial rapid polarization control and mode control are used to realize rapid switching of all the modes supported by the optical fiber to be measured at the input end, and the transmission matrix measurement process is rapidly performed at the output end of the optical fiber to be measured, thereby values of different rows of the transmission matrix are obtained, and finally the rapid measurement of ultra-long distance optical fiber transmission matrix is completed.

Figure 2:
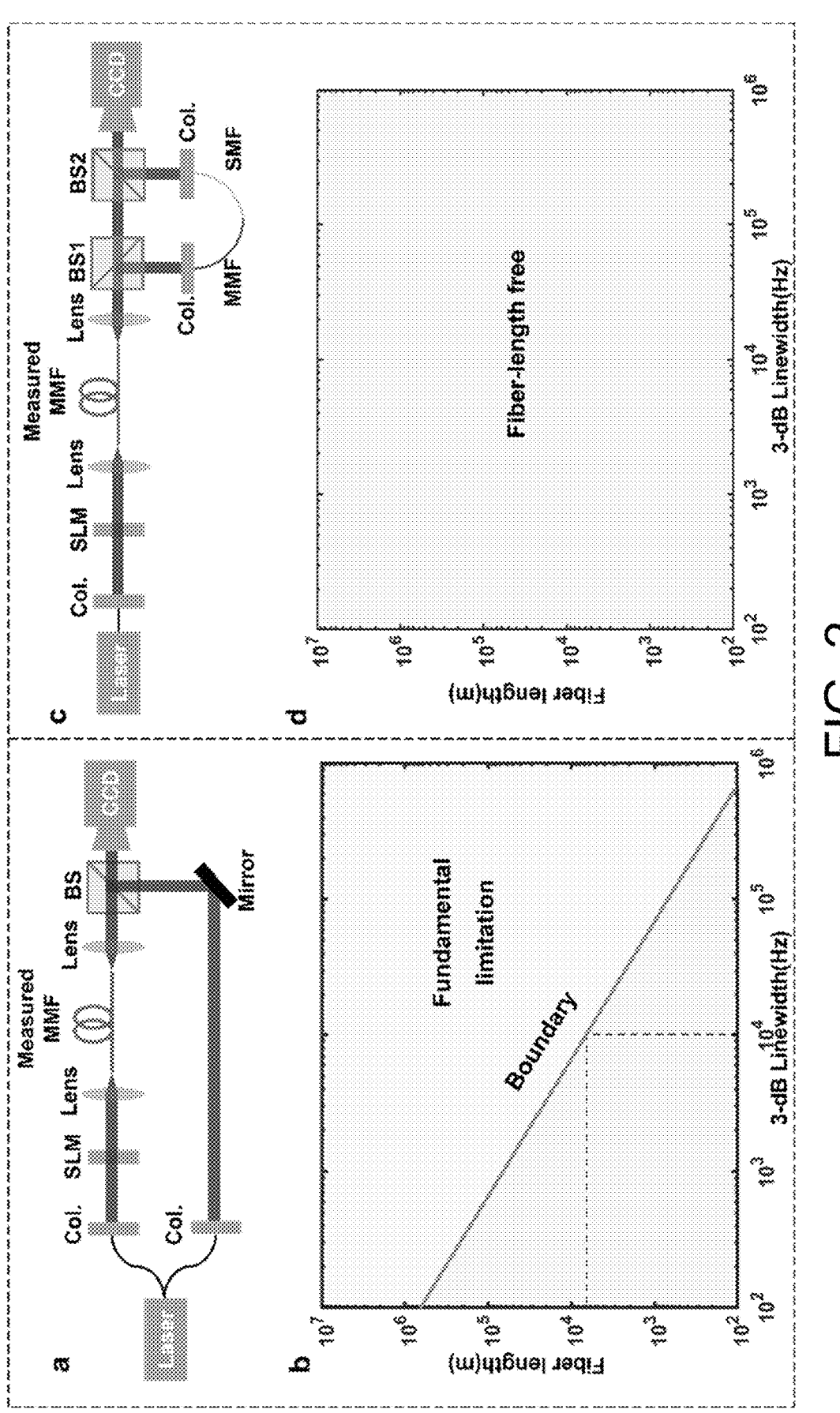
FIG. 2 is a comparison of a solution of rapid measurement of the ultra-long distance optical fiber transmission matrix provided by the disclosure and the conventional technical solution.

As shown in FIG. 2, which is a comparison of a solution of rapid measurement of ultra-long distance optical fiber transmission matrix provided by the disclosure and the conventional technical solution, the specific implementation method is as follows:

The drawing (a) in FIG. 2 is a schematic diagram of a device of a conventional technical solution, and the light beam output by the laser is split into a signal path and a reference path according to the conventional technical solution. In the operation, the signal path is controlled to the mode required, coupled into the multi-mode optical fiber to be measured for transmission, and combined with the reference path at the output end, and interference occurs. The complex amplitude of the light field is reconstructed through the interference pattern recorded by the CCD, and the weight coefficients of the different modes in the output field are calculated. In the conventional technical solution, the signal light is transmitted through the optical fiber to be measured, while the reference path does not pass through such a path. Therefore, there is an optical path difference of the length of the optical fiber to be measured between the signal light and the reference path, which puts forward requirements for the coherence of the laser. Considering the coherence time and coherence length definition of the laser, for the optical path difference of the optical fiber to be measured with a length of L, the line width of the laser has to at least meet the following requirements to achieve interference between the signal path and the reference path:

$$nL < L_C = \frac{c}{\Delta v}, \tag{2}$$

In the equation, $L_C$ is the coherence length of the laser, c is the speed of light in a vacuum, n is the refractive index of the optical fiber to be measured, and $\Delta v$ is the line width of the laser. Therefore, there is a certain relationship between the laser line width and the measurable length of the optical fiber to be measured. As shown in (b) in FIG. 2, the conventional technical solution can only measure the part below the orange coherence boundary. Taking a 10 kHz line width laser as an example, it is notably not able to measure a 10 km optical fiber transmission matrix. In fact, considering the influence of interference contrast on complex amplitude reconstruction, the coherence boundary in (b) in FIG. 2 is more stringent. In contrast, the technical solution provided by the disclosure is shown in (c) in FIG. 2. The light beam output by the laser is controlled to the mode required and coupled into the multi-mode optical fiber to be measured for transmission. At the output end, the optical field is split into a signal path and a reference path by BS1. The reference path obtains a common path reference light through a spatial filtering converting from a multi-mode optical fiber to a single-mode optical fiber (the operation is an example of obtaining the common path reference light, and the disclosure is not limited thereto). The signal path and the common path reference path light are combined by BS2, the interference occurs, and the interference field is recorded by CCD to reconstruct the complex amplitude of the signal path light field, thereby the weight coefficients of the different modes are obtained. In the technical solution provided by the disclosure, the signal path and the reference path share a common path, so there is no coherence limitation in the conventional technical solution. Therefore, the laser line width is independent of the measurable length of the optical fiber, as shown in (d) in FIG. 2.

Figure 3:
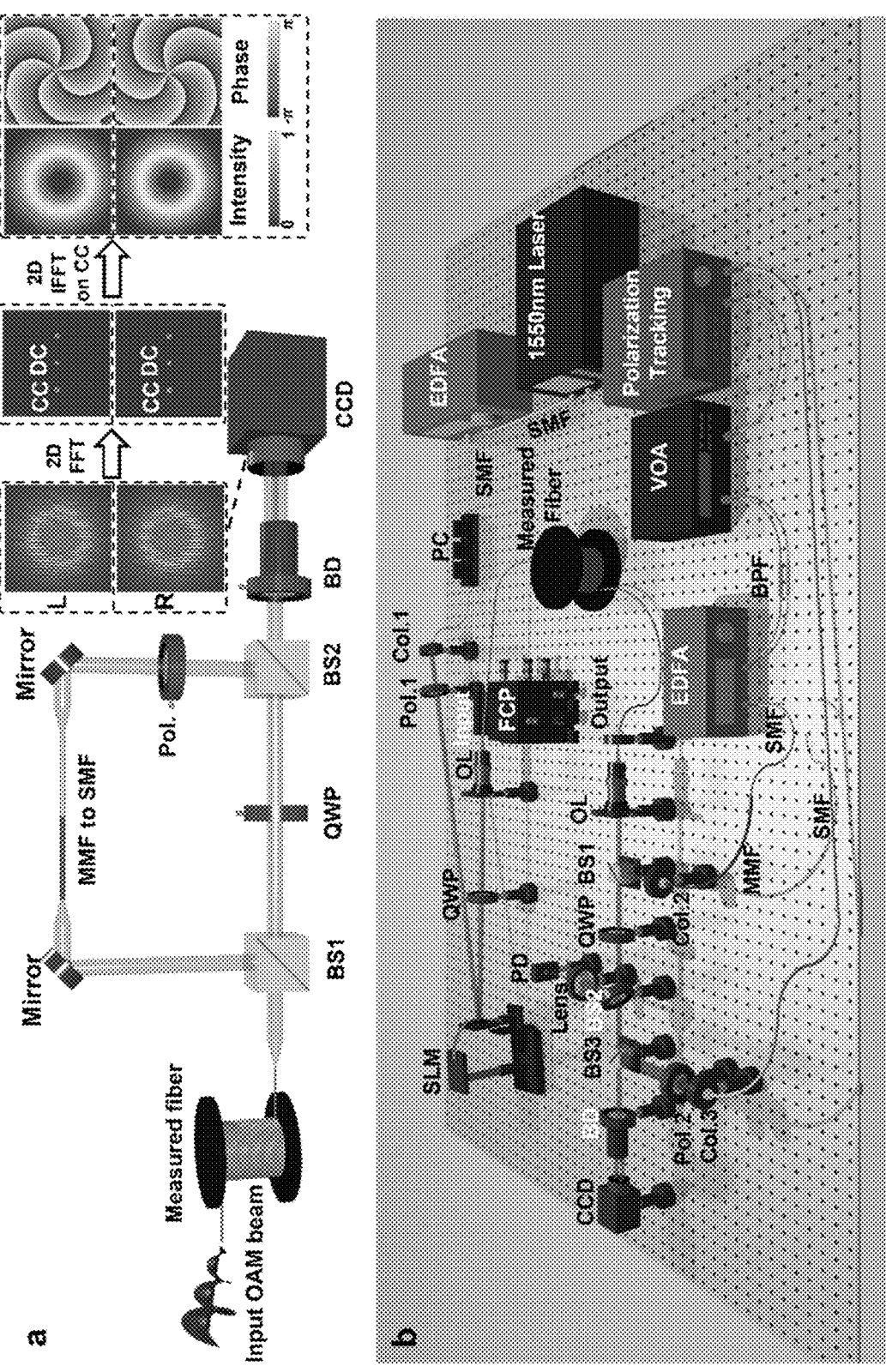
FIG. 3 is a schematic diagram of a principle and a device of rapid measurement of the ultra-long distance optical fiber transmission matrix provided by the disclosure.

As shown in FIG. 3, which is a schematic diagram of a principle and a device of rapid measurement of ultra-long distance optical fiber transmission matrix provided by the disclosure, the specific implementation method is as follows:

The drawing (a) in FIG. 3 is a schematic diagram of the principle of rapid measurement of ultra-long distance optical fiber transmission matrix provided by the disclosure, which uses left-handed and right-handed circularly polarized vortex light beams of carrying orbital angular momentum as the measurement mode basis. The incident orbital angular momentum light beam is coupled into the optical fiber to be measured for transmission, and the light beam output at the output end of the optical fiber to be measured is split into a signal path and a reference path by BS1. In the operation, the reference path is converted from a multi-mode optical fiber to a single-mode optical fiber through a common path reference light obtaining solution to obtain a common path Gaussian reference light, and a polarizer Pol. is used to limit the polarization of the reference light. The signal path and the reference path light beams are combined by BS2, and off-axis interference occurs. A beam displacer BD is used to split the two orthogonal linear polarizations. QWP of the signal path maps the left-handed and right-handed circular polarizations to the two orthogonal linear polarizations respectively, thereby the off-axis interference light fields under the two orthogonal circular polarization channels are measured on the CCD. When the off-axis interference occurs, the light field distributions of the signal light and the reference light may be respectively written as, $$E_S(x, y) = |E_S(x, y)| e^{i\varphi_S(x,y)} \tag{3}$$

$$E_R(x, y) = |E_R(x, y)| e^{i[\varphi_R(x,y) - 2\pi u_0 x]} \tag{4}$$

In the equation, $E_S(x,y)$ is the complex amplitude distribution of the signal light, $\varphi_S(x,y)$ is the phase distribution of the signal light, $E_R(x,y)$ is the complex amplitude distribution of the reference light, $\varphi_R(x,y) - 2\pi u_0 x$ is the phase distribution of the reference light, and the term $-2\pi u_0 x$ represents the off-axis phase of the reference light. The interference field after the beams of the two light fields are combined is written as:

$$|E_{inter}(x, y)|^2 = [E_S(x, y) + E_R(x, y)] \cdot [E_S(x, y) + E_R(x, y)]^* = \tag{5}$$

$$|E_S(x, y)|^2 + |E_R(x, y)|^2 + |E_S(x, y)||E_R(x, y)| e^{i[\varphi_S(x,y) - \varphi_R(x,y) + 2\pi u_0 x]} +$$

$$|E_S(x, y)||E_R(x, y)| e^{i[-\varphi_S(x,y) + \varphi_R(x,y) - 2\pi u_0 x]} =$$

$$a(x, y) + b(x, y) e^{i2\pi u_0 x} + b^*(x, y) e^{-i2\pi u_0 x}$$

In the equation, $(x,y) = |E_S(x,y)|^2 + |E_R(x,y)|^2$ is the DC term of the off-axis interference, the other two terms are the AC terms of the off-axis interference, the two terms are complex conjugates of each other, and such off-axis interference AC terms are written as $b(x,y) = |E_S(x,y)||E_R(x,y)| e^{i[\varphi_S(x,y) - \varphi_R(x,y)]}$. Fourier transform is performed on the off-axis interference field represented by equation (5), taking a one-dimensional Fourier transform in an x direction as an example:

$$\mathcal{F}\{|E_{inter}(x, y)|^2\} = A(u, y) + B(u - u_0, y) + B^*(u + u_0, y) \tag{6}$$

That is, in the spatial frequency domain after Fourier transform, the interference DC term and AC term are separated, so the interference AC term $B(u - u_0, y)$ is filtered out and moved to the center of the spatial frequency domain, and then by performing an inverse Fourier transform, the complex amplitude distribution of the signal light may be obtained:

$$\mathcal{F}^{-1}\{B(u, y)\} = b(x, y) = |E_S(x, y)||E_R(x, y)| e^{i[\varphi_S(x,y) - \varphi_R(x,y)]} \tag{7}$$

In this way, the complex amplitude distribution of the light field may be obtained through the off-axis interference hologram. As shown in (a) in FIG. 3, measurement results of the left-handed channel-5th order vortex light beam and the right-handed channel 5th order vortex light beam are shown.

In this measurement, a two-dimensional Fourier transform is performed on the light field to obtain the spatial frequency domain as shown in the drawing, an interference AC term CC is separated from an interference DC term DC. The CC term is filtered out and moved to the center of the spatial frequency domain, and then after performing an inverse Fourier transform, the light field intensity and phase distribution of the 5th order and −5th order vortex light beams may be obtained as shown in the drawing.

The drawing (b) in FIG. 3 is a schematic diagram of the device of rapid measurement of ultra-long distance optical fiber transmission matrix provided by the disclosure. The laser output by the 1550 nm laser is connected to an erbium-doped fiber amplifier EDFA through a single-mode optical fiber SMF to achieve power amplification. The output end of the EDFA is connected to a polarization controller PC to control the polarization of the light beam in the single-mode optical fiber. PC is connected to a collimator Col.1 to realize Gaussian mode light output in free space. A polarizer Pol.1 limits the polarization of the light beam to the working polarization of a spatial light modulator SLM. The spatial light modulator corresponds to a rapid mode control module (which may be replaced with digital micromirror devices to achieve higher rate control). The quarter wave plate QWP is used for rapid polarization control, the light beam after passing through the SLM and QWP is the specific light beam mode required. The light beam mode is coupled through an objective lens OL and entered the optical fiber to be measured placed on an optical fiber coupling platform FCP for transmission. At the output end of the optical fiber to be measured, the output light field is collimated by the objective lens OL and then split into a signal path and a reference path by the beam splitter BS1. In the operation, the signal path passes through the quarter wave plate QWP, which maps left-handed and right-handed circular polarizations into linearly polarized light beams in the x direction and a y direction respectively. The beam splitter BS2 is added to the signal path to split a portion of the light of the signal path and couple to a detector PD through a lens element to be received and used as reference information for power matching between the signal path and the reference path. The reference path light beam is coupled into a multi-mode optical fiber MMF by a collimator Col.2 and connected to the single-mode optical fiber SMF for spatial filtering to obtain the Gaussian mode light beam required for the reference light. The output end of the single-mode optical fiber is connected to the erbium-doped fiber amplifier EDFA, and the EDFA works in a constant power output mode. The EDFA output is connected to a band pass filter BPF to filter out the spontaneous emission ASE noise of the EDFA and improve the off-axis interference contrast. The BPF output is connected to a programmable variable optical attenuator VOA. The VOA receives the magnitude of the power fed back from the signal path and rapidly controls the magnitude of the attenuation applied, so as to achieve power matching between the signal path and the reference path. The output end of the VOA is connected to a polarization tracking module, and the output of the polarization tracking module is connected to a collimator Col.3 to obtain a Gaussian light beam with a large waist in free space as the reference light. A polarizer Pol.2 limits the polarization of the reference light to 45° to ensure that both orthogonal polarization measurement channels have the same reference light intensity. The signal path and the reference path light beams are combined by a beam splitter BS3, the interference occurs, and the beam displacer BD is used to split the off-axis interference into two orthogonal polarization channels to be received by the CCD. The off-axis interference holograms of the two polarization channels received by the CCD can reconstruct the complex amplitude distribution of the light field under the two polarization channels. By performing overlapping integral on the complex amplitude distribution and the complex amplitude distributions of ideal modes of the respective orders, power coefficients of different modes may be obtained. Measurement of the mode transmission matrix of the optical fiber to be measured can be achieved by rapidly switching the incident light beam modes.

Since the reference light in the device is obtained by splitting the light beam transmitted through the ultra-long distance optical fiber to be measured and undergoing spatial filtering processing converting from the multi-mode optical fiber to the single-mode optical fiber, when different light beam modes are input into the optical fiber to be measured, the global phase of the reference light obtained by the above operation is a different unknown global phase. Since the light field phase information measured by the interference method is the phase difference between the signal light and the reference light, there is an unknown phase difference between different rows of the phase transmission matrices obtained under input conditions of different light beam modes. To solve the problem, the disclosure provides a method of measurement of ultra-long distance few-mode/multi-mode optical fiber phase transmission matrix, and the specific implementation method is as follows:

The input end inputs a first mode and a second mode into the optical fiber to be measured respectively through the rapid polarization control and mode control to obtain a first interference light field and a second interference light field, the light field of the first mode after being transmitted through the long-distance optical fiber to be measured is written as $|E_{1S}|e^{i\varphi_{1S}}$, and the light field of the second mode after being transmitted through the long-distance optical fiber to be measured is written as $|E_{2S}|e^{i\varphi_{2S}}$. When the first mode is input, the global phase of the first reference light is $\varphi_{1R}$, and when the second mode is input, the global phase of the second reference light is $\varphi_{2R}$. The light field distributions of the first mode and the second mode obtained by measurement of the first interference light field and the second interference light field may be written as $|E_{1S}|e^{i(\varphi_{1S}-\varphi_{1R})}$ and $|E_{2S}|e^{i(\varphi_{2S}-\varphi_{2R})}$ respectively. Afterward, the superimposed state of the first mode and the second mode is input into the optical fiber to be measured to obtain a third interference light field. The intensity distribution of the light field of the superimposed state of the first mode and the second mode after being transmitted through the optical fiber to be measured may be obtained through the third interference light field and may be expressed as:

$$|E_{2S} + E_{1S}|^2 = (E_{2S} + E_{1S})(E_{2S} + E_{1S})^* = \qquad (8)$$

$$\left(|E_{2S}|e^{i\varphi_{2S}} + |E_{1S}|e^{i\varphi_{1S}}\right)\left(|E_{2S}|e^{i\varphi_{2S}} + |E_{1S}|e^{i\varphi_{1S}}\right)^* =$$

$$|E_{2S}|^2 + |E_{1S}|^2 + 2|E_{2S}||E_{1S}|\cos(\varphi_{2S} - \varphi_{1S}) = |E_{2S}|^2 + |E_{1S}|^2 +$$

$$2|E_{2S}||E_{1S}|\cos[(\varphi_{2S} - \varphi_{2R}) - (\varphi_{1S} - \varphi_{1R}) + (\varphi_{2R} - \varphi_{1R})]$$

Since $|E_{1S}|$, $|E_{2S}|$, $(\varphi_{1S}-\varphi_{1R})$, and $(\varphi_{2S}-\varphi_{2R})$ are all known, the global phase difference $(\varphi_{2R}-\varphi_{1R})$ of the reference light under input conditions of the first mode and the second mode may be obtained through the three interference light fields. Therefore, the two phase differences between different rows of the phase transmission matrix obtained under input conditions of the first mode and the second mode become known terms. By rapidly switching the input mode and the input mode superimposed state, the phase transmission matrix of different rows of the optical fiber to be measured can be measured and the phase difference between different rows can be obtained, thereby the entire phase transmission matrix of the optical fiber to be measured is obtained.

Figure 4:
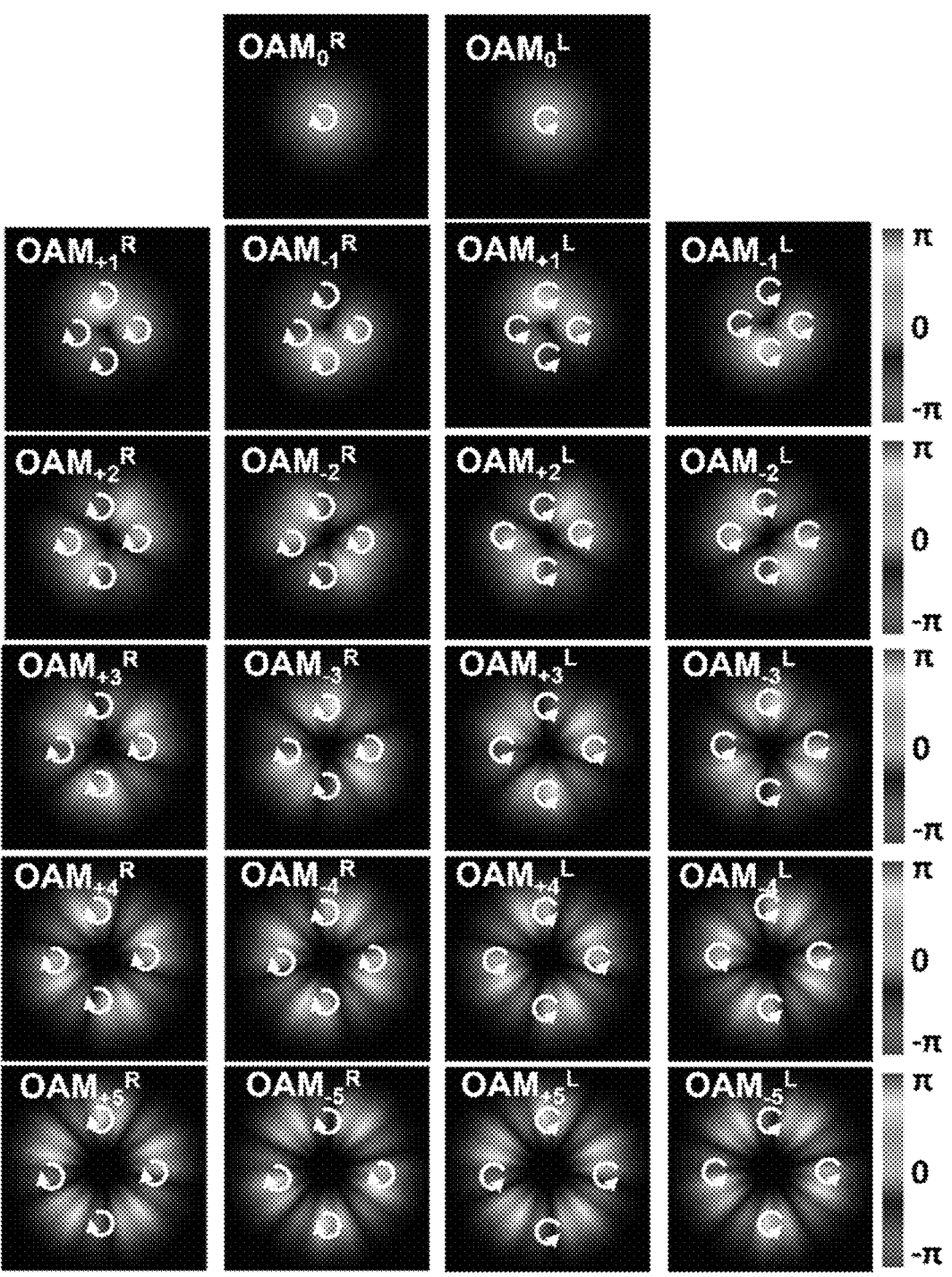
FIG. 4 is an ideal field distribution of all circularly polarized vortex light beam modes supported in the ring core optical fiber to be measured provided by the disclosure.

As shown in FIG. 4, which is the ideal field distribution of all circularly polarized vortex light beam modes supported in the ring core optical fiber to be measured provided by the disclosure, the specific implementation method is as follows:

All circularly polarized vortex light beam modes supported in the ring core optical fiber to be measured in the embodiments are shown, which are split into 6 mode groups and 22 vortex modes. Except for the 0th order mode group, the remaining five mode groups respectively have four vortex light beams with opposite topological charges and orthogonal polarizations.

Figure 5:
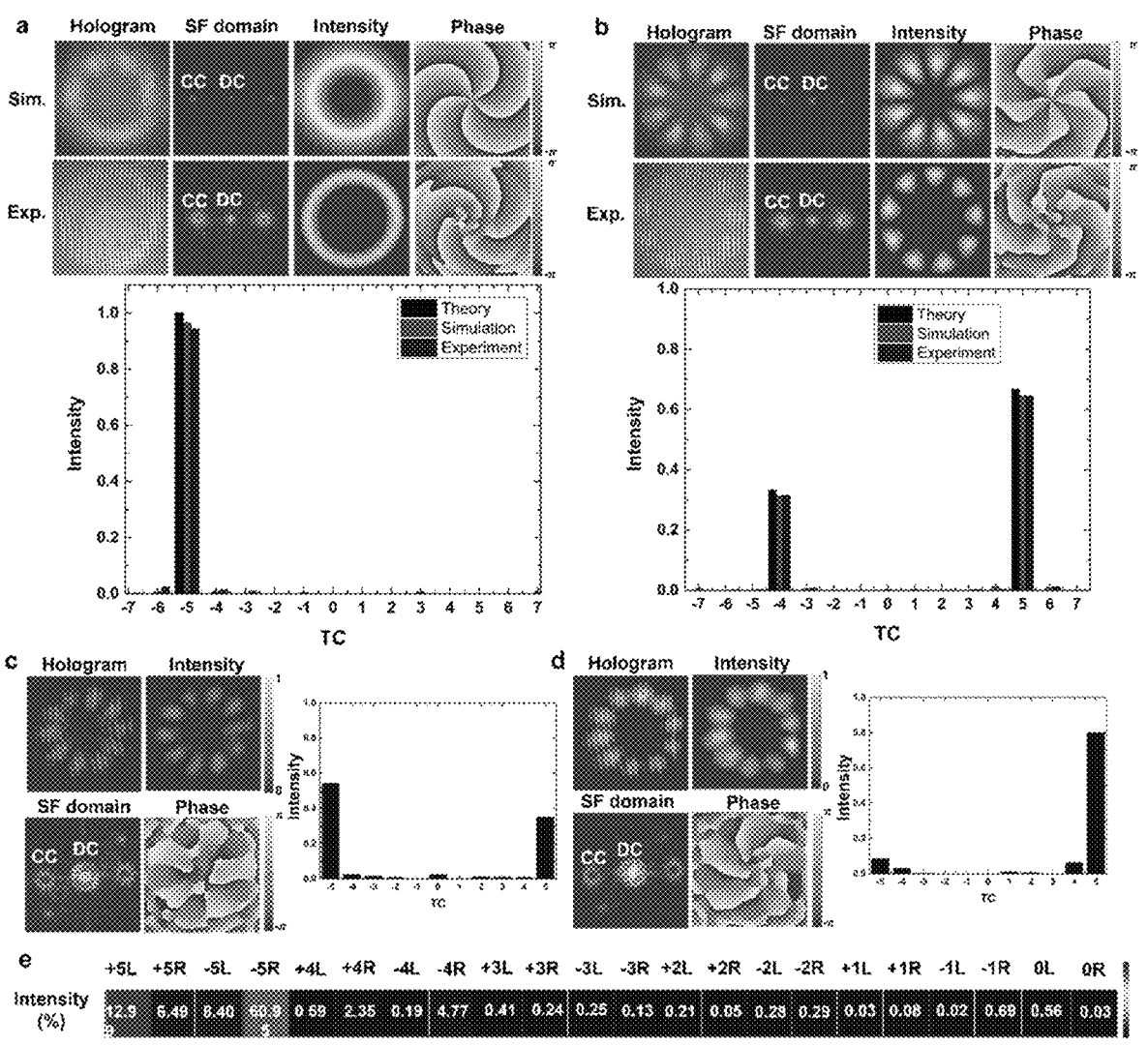
FIG. 5 is an experimental result of measuring complex amplitude distribution of a light field and mode weight coefficient in free space and ring core optical fiber using off-axis holographic technology provided by the disclosure.

As shown in FIG. 5, which is the experimental result of measuring the complex amplitude distribution of the light field and mode weight coefficient in free space and ring core optical fiber using off-axis holographic technology provided by the disclosure, the specific implementation method is as follows:

The drawings (a) and (b) in FIG. 5 are the results of reconstructing the complex amplitude distribution of the light field using off-axis digital holography technology in free space. In the drawing, (a) in FIG. 5 shows the off-axis interference hologram obtained by off-axis interference of a pure-5th order vortex light beam in free space in simulation and experiment, the spatial frequency domain after Fourier transform, the reconstructed intensity and phase distribution, and the power weights of different orders of vortex light beams calculated by overlapping integral. The drawing (b) in FIG. 5 shows the measurement results of similar-4th order and 5th order vortex light beams superimposed with a power ratio of 1:2. The drawings (c) and (d) in FIG. 5 respectively show the crosstalk matrix measurement results of the device in the embodiment of FIG. 3 (b) when a 5th order left-handed circularly polarized vortex light beam is incident on a 100 km ring core optical fiber. The drawing (c) in FIG. 5 shows the measurement result of the left-handed circularly polarized channel at the receiving end, the light field distribution of the left-handed circularly polarized channel is reconstructed by the off-axis interference hologram recorded, and then the power weights of different orders of vortex modes are calculated by overlapping integral. The drawing (d) in FIG. 5 shows the measurement result of the left-handed circularly polarized channel at the receiving end, the light field distribution of the right-handed circularly polarized channel is reconstructed by the off-axis interference hologram recorded, and then the power weights of different orders of vortex modes are calculated by overlapping integral. The power weights calculated in the two channels are both 1×11 crosstalk matrices, which are then normalized according to the ratio of the signal light intensities in the two polarization channels, and the two 1×11 crosstalk matrices are normalized to a 1×22 crosstalk matrix. By rapidly switching the modes at the input end and performing a similar process, measurement of a 22×22 ring core optical fiber crosstalk matrix can be achieved.

Figure 6:
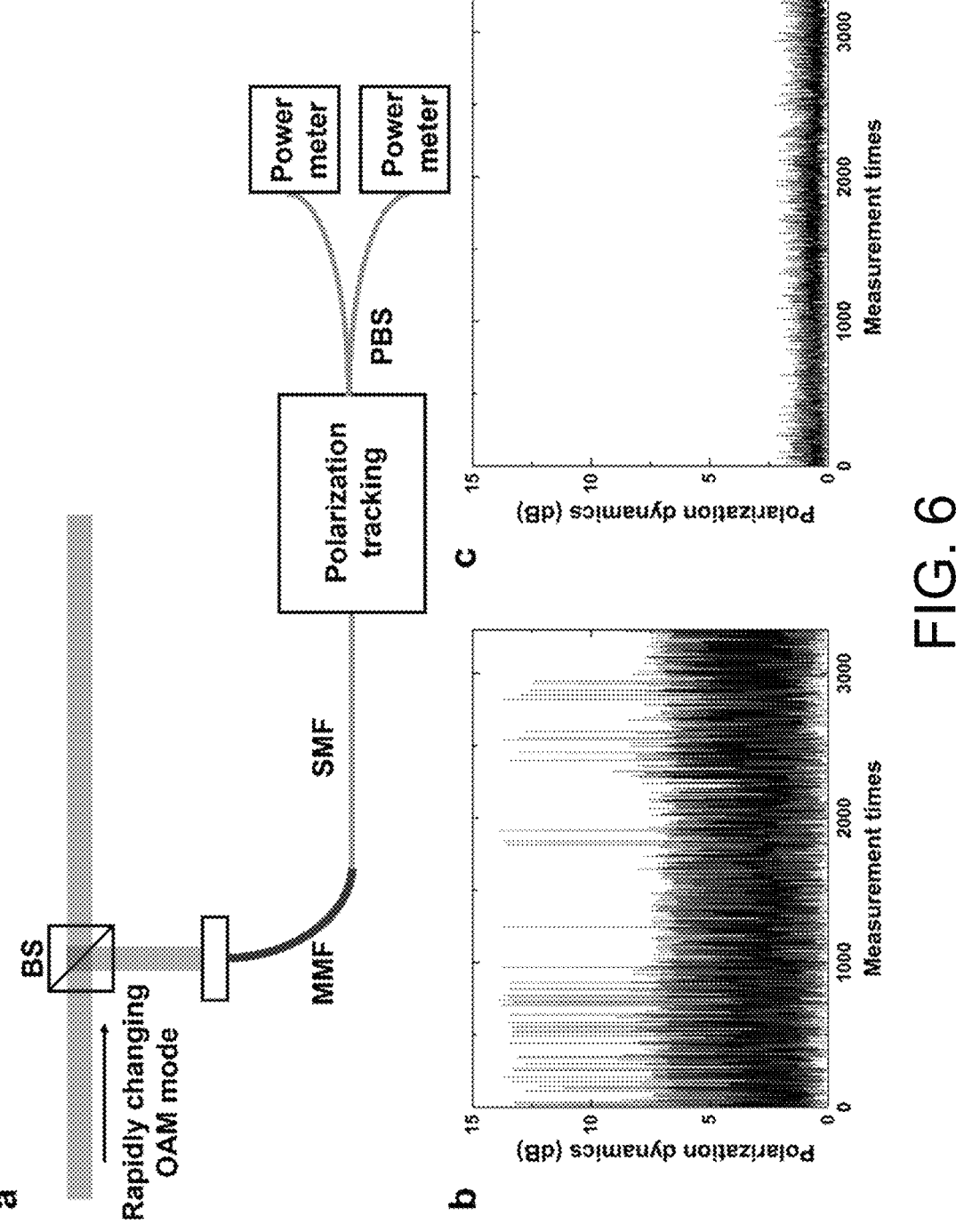
FIG. 6 is a diagram showing efficiency validation experimental device and results of a polarization tracking module in a device according to an embodiment of the disclosure.

As shown in FIG. 6, which are the efficiency validation experimental device and results of the polarization tracking module in the embodiment (b) in FIG. 3 provided by the disclosure, the specific implementation method is as follows:

The drawing (a) in FIG. 6 shows an experimental setup for validating the efficiency of the polarization tracking module. The incident beam is a rapid-switching vortex light beam, and after being split by BS, one path is a signal path and the other path is a reference path. Here, the polarization tracking effect of the reference path is examined. The reference path light beam is connected to the single-mode optical fiber through the multi-mode optical fiber to achieve spatial filtering of the high-order mode to the zero-order Gaussian light beam, thereby a common path reference Gaussian light beam is obtained. Since the vortex light beam incident on the multi-mode optical fiber is a rapidly changing vortex light beam, the polarization state of the Gaussian reference light output by the single-mode optical fiber changes rapidly and is not one stable polarization state. The off-axis holographic technology requires that the light field intensities of the two orthogonal polarization channels of the reference light are similar, that is, a linearly polarized beam of approximately 45°. Therefore, a polarization tracking device is added. Here, after the polarization tracking device, a polarization beam splitter PBS is used to split the light beam into two paths of polarizations, and the power ratio of the two orthogonal polarizations is measured to examine the degree of polarization jitter. FIG. 6 (b) shows the polarization jitter before polarization tracking is enabled. The range of polarization jitter exceeds 10 dB. After polarization tracking is enabled, the range of polarization jitter is limited to less than 2.5 dB.

Figure 7:
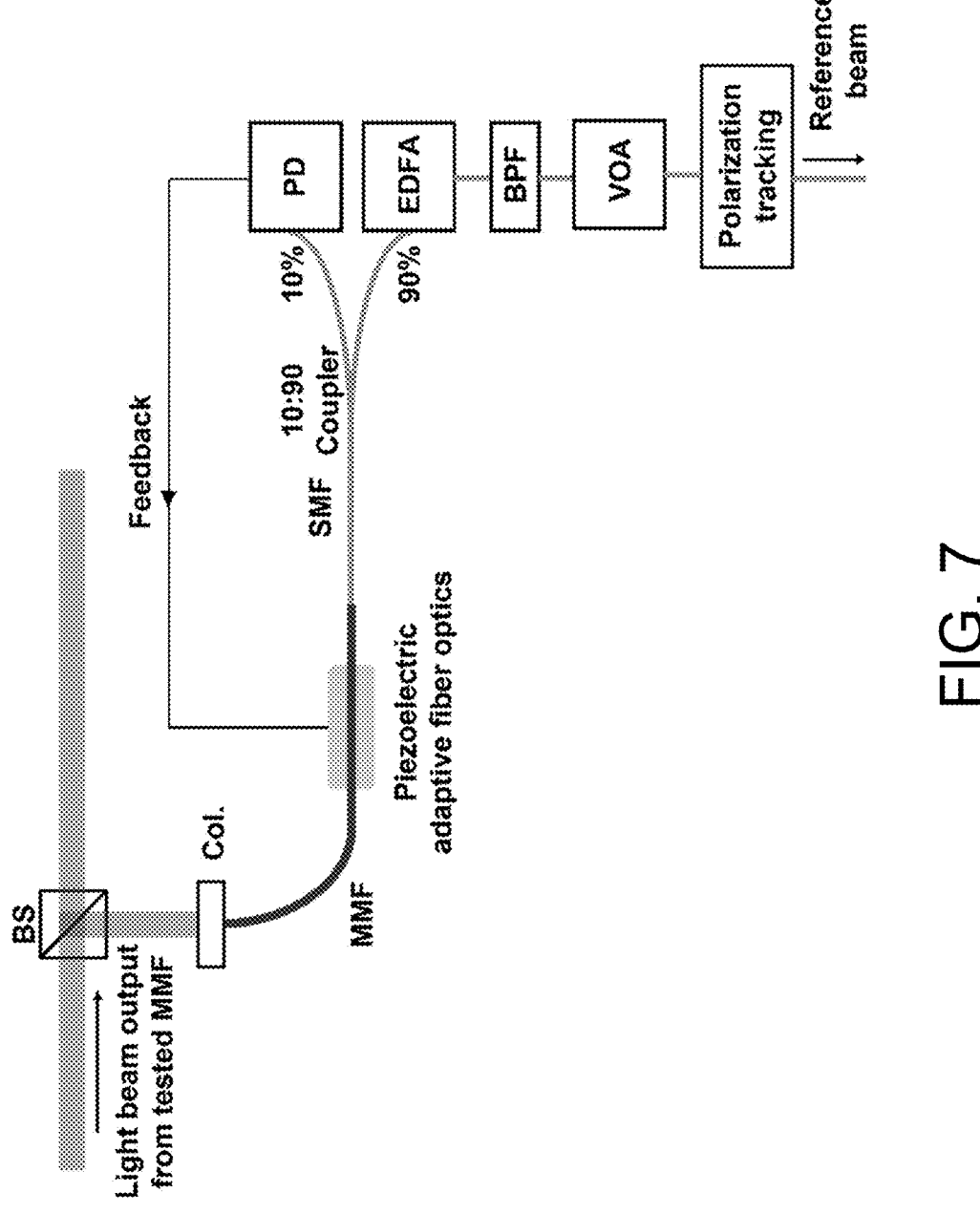
FIG. 7 is a diagram showing a working principle of an optical fiber rapid perturbation module provided by the disclosure.

As shown in FIG. 7, which is a working principle of an optical fiber rapid perturbation module provided by the disclosure, the specific implementation method is as follows:

When the reference light obtaining module used is a device connecting a multi-mode optical fiber and a single-mode optical fiber, since the incident light beam of the multi-mode optical fiber is switching rapidly, the light field transmitted in the multi-mode optical fiber also changes rapidly, and thus there may be a situation in which the light beam in the multi-mode optical fiber cannot be coupled into the single-mode optical fiber. In this case, the optical fiber rapid perturbation module such as a piezoelectric ceramic tube as shown in FIG. 7 is introduced. The field output by the multi-mode optical fiber to be measured is split into two paths by the BS, in which the reference path is coupled into the multi-mode optical fiber by a collimating lens element. The multi-mode optical fiber is connected to the single-mode optical fiber to realize spatial filtering to obtain the reference common path Gaussian light. The piezoelectric ceramic tube is added to the multi-mode optical fiber as the optical fiber rapid perturbation module, and a 10:90 fiber beam splitter is used at the output end of the single-mode optical fiber to split the reference light, in which an output port of 90% of the energy is transmitted through the erbium-doped fiber amplifier EDFA, the band pass filter BPF, the variable optical attenuator VOA, and the polarization tracking module to be used as the reference light for off-axis interference, and an output port of 10% of the energy is used to construct a feedback device to be connected to the PD, and when the power is detected to be 0, the piezoelectric ceramic tube is controlled to jitter rapidly to ensure that the reference light intensity meets the off-axis holographic requirements.

Figure 8:
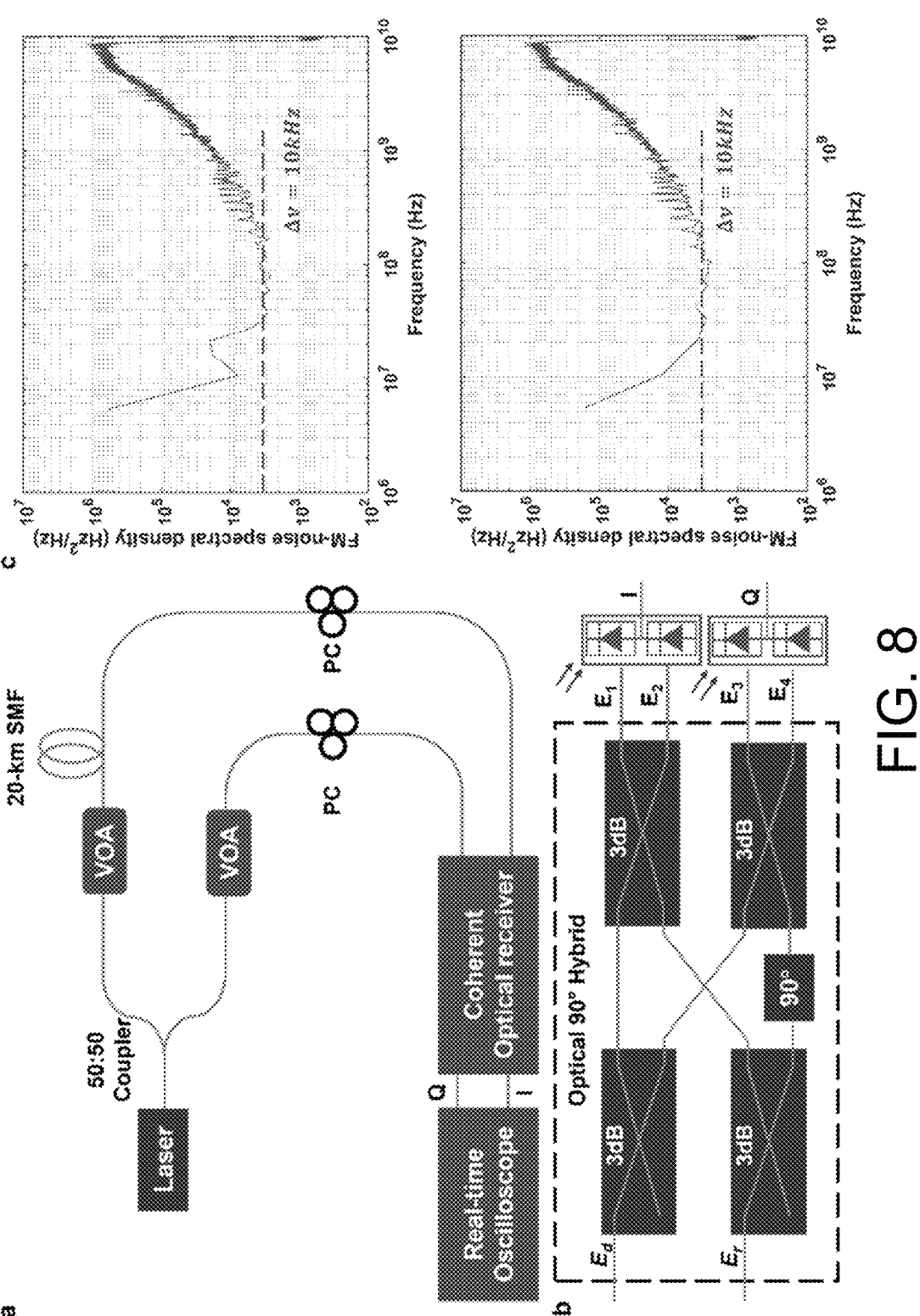
FIG. 8 is an experimental setup and result for measuring the laser line width in a device according to an embodiment of the disclosure.

As shown in FIG. 8, which are the experimental setup and result for measuring the laser line width in the embodiment (b) in FIG. 3 provided by the disclosure, the specific implementation method is as follows:

The drawing (a) in FIG. 8 shows an experimental setup for measuring the laser line width. The laser output signal is split into two paths by a 50:50 optical fiber coupler, in which one path passes through the variable optical attenuator VOA and the polarization controller PC and then is incident on the coherent detector, and the other path, in contrast, additionally passes through a 20 km single-mode optical fiber delay and then is incident on the coherent detector from another port. The two paths of light beams pass through a 90° Hybrid in the coherent detector to obtain I/Q signal outputs. The oscilloscope samples the I/Q signals, and through the I/Q path signal ratio, the frequency modulation noise spectrum of the laser is obtained, thereby the line width of the laser is calculated. The laser line width should be $\pi$ times the frequency of the white noise range in the frequency modulation noise spectrum. FIG. 8 (*b*) shows the principle diagram of the 90° Hybrid inside the coherent detector. After the two paths of incident lights pass through the 90° Hybrid, two I/Q signal outputs are obtained. FIG. 8 (*c*) shows the results of two different measurements. The $\pi$ times frequency of the white noise range of both measurements are about 10 kHz, that is, the line width of the laser used is 10 kHz.

Figure 9:
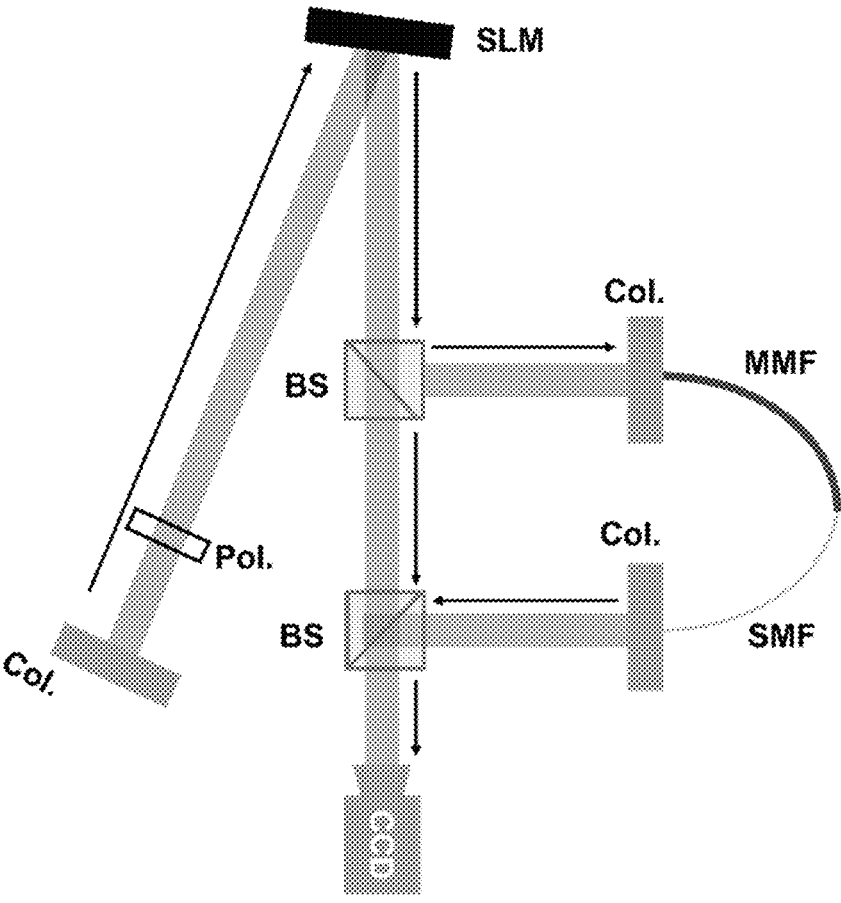
FIG. 9 is a principle validation experimental setup of a method of measurement of phase transmission matrix provided by the disclosure.

As shown in FIG. 9, which is the principle validation experimental setup of a method of measurement of phase transmission matrix provided by the disclosure, the specific implementation method is as follows:

The collimated Gaussian light beam in free space output by the collimator Col. is modulated into a specific mode after passing through the polarizer Pol. and the spatial light modulator SLM. The light beam output by the SLM is split into a signal path and a reference path by the BS, in which the reference path is set up through the spatial filtering converting the multi-mode optical fiber to the single-mode optical fiber to obtain the Gaussian mode reference light beam. Through another BS, the signal path and the reference path are combined to generate off-axis interference and recorded by the CCD. In this principle validation experiment, the light beam modulated by the SLM is a superimposed state of different modes to simulate the field output after being transmitted by the long-distance optical fiber to be measured. In the principle validation experiment, the field corresponding to the 5th order beam is set to a beam in which −5th order, −4th order, +4th order, and +5th order vortex light beams are superimposed with a power ratio of [46%, 4%, 4%, 46%] and a global phase of [0, 0.5π, π, 1.5π]. The field corresponding to the 4th order light beam is set to a beam in which −5th order, −4th order, +4th order, and +5th order vortex light beams are superimposed with a power ratio of [5%, 15%, 75%, 5%] and a global phase of [0.7π, 1.8π, 1.3π, 1.3π]. Firstly, a 5th order superimposed field (corresponding to the first mode of the disclosure solution) is input, and the off-axis interference hologram thereof is recorded; then, a 4th order superimposed field (corresponding to the second mode of the disclosure solution) is input, and the off-axis interference hologram thereof is recorded; finally, the superimposed light beams of the two superimposed fields (corresponding to the superimposed states of the first mode and the second mode of the disclosure solution) are input, and the off-axis interference hologram thereof is obtained. Based on the three off-axis interference holograms, the 4th order and 5th order phase transmission matrices may be calculated using the technical solution provided in the disclosure.

Figure 10:
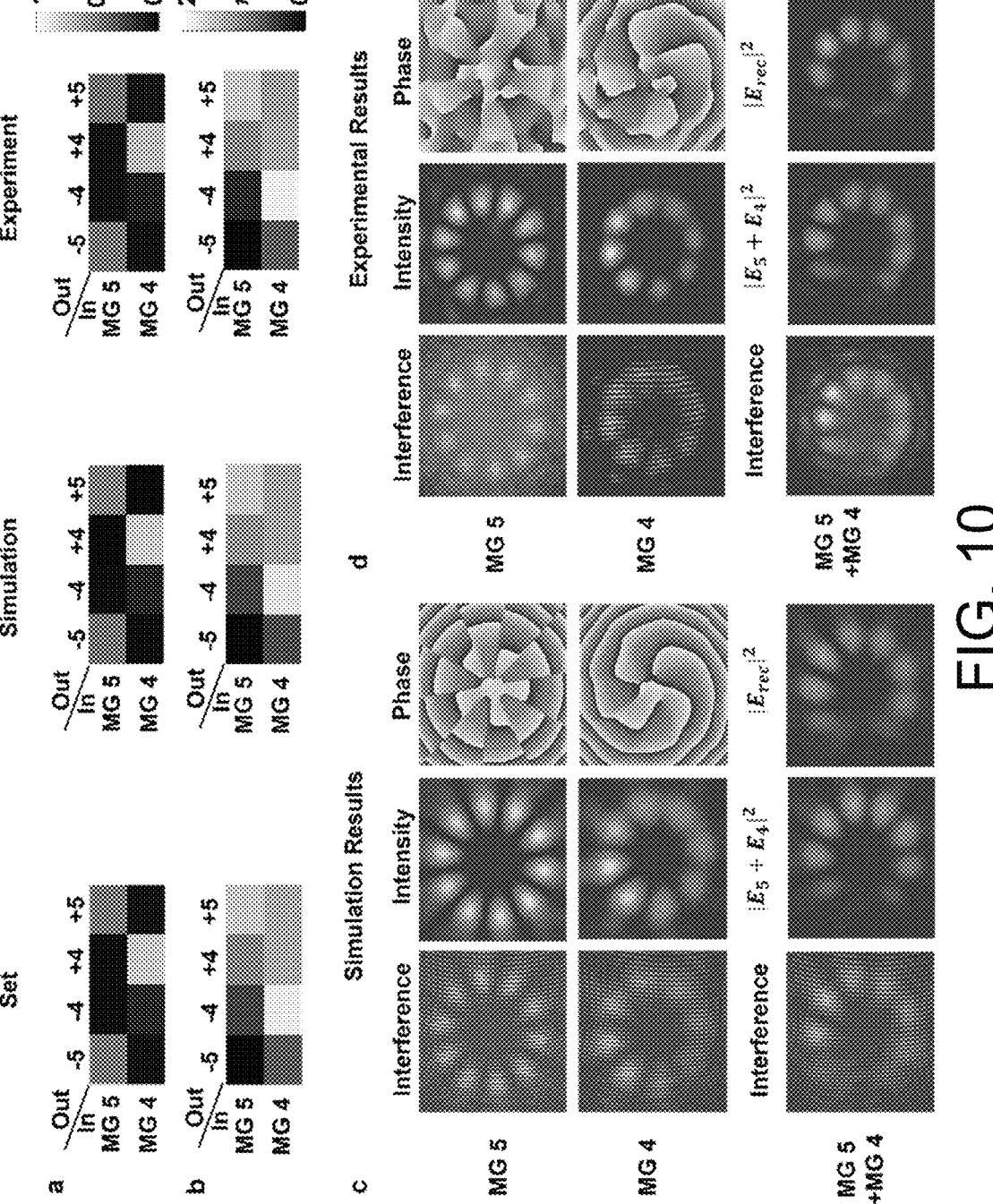
FIG. 10 is a principle validation experimental result of a method of measurement of phase transmission matrix provided by the disclosure.

As shown in FIG. 10, which is the principle validation experimental result of a method of measurement of phase transmission matrix provided by the disclosure, the specific implementation method is as follows:

The drawings (a) and (b) in FIG. 10 respectively show the set values of the intensity matrix and the phase matrix of the set 5th order and 4th order light fields, as well as the intensity matrix and the phase matrix of the 5th order and 4th order light fields measured in simulation and experiments based on the technical solution proposed in the disclosure. The drawing (c) in FIG. 10 shows the intermediate results of the simulation, including the off-axis interference hologram of the simulated 5th order light field and the intensity and phase distribution of the 5th order light field reconstructed based thereon (the first row), the off-axis interference hologram of the simulated 4th order light field and the intensity and phase distribution of the 4th order light field reconstructed based thereon (the second row), and the off-axis interference hologram of the simulated 5th order and 4th order light field superimposed state, the intensity distribution of the superimposed state light field reconstructed based on the off-axis interference hologram, and the intensity distribution of the superimposed state light field reconstructed according to the measured intensity matrix and phase matrix (the third row). It may be seen that the measured intensity matrix and phase matrix can well restore the light field of the superimposed state due to the high accuracy thereof. The drawing (d) in FIG. 10 shows the intermediate results of the experiment, including the off-axis interference hologram of the experimental 5th order light field and the intensity and phase distribution of the 5th order light field reconstructed based thereon (the first row), the off-axis interference hologram of the experimental 4th order light field and the intensity and phase distribution of the 4th order light field reconstructed based thereon (the second row), and the off-axis interference hologram of the experimental 5th order and 4th order light field superimposed state, the intensity distribution of the superimposed state light field reconstructed based on the off-axis interference hologram, and the intensity distribution of the superimposed state light field reconstructed according to the measured intensity matrix and phase matrix (the third row). It may be seen that the measured intensity matrix and phase matrix can well restore the light field of the superimposed state due to the high accuracy thereof.

Figure 11:
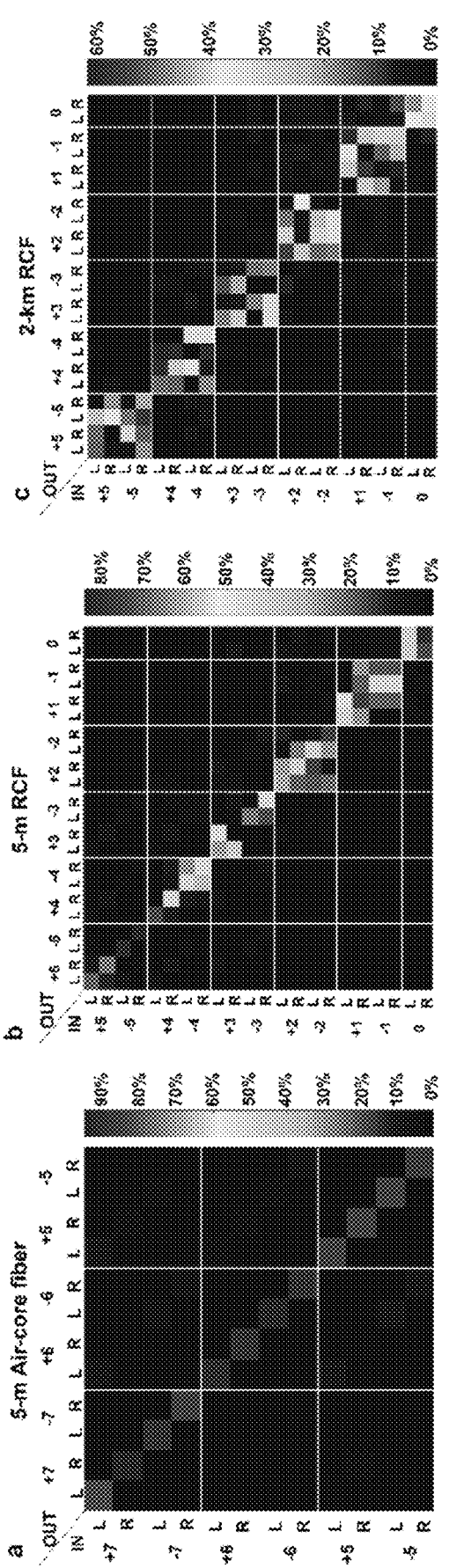
FIG. 11 is an experimental result of measuring different optical fiber transmission matrices using the device according to an embodiment of the disclosure.
Figure 11:
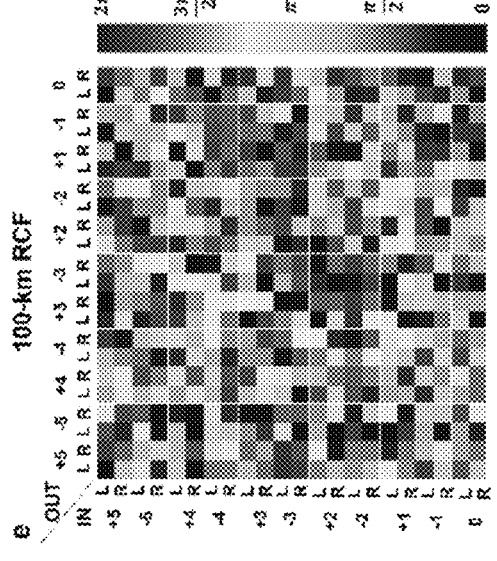
Figure 11:
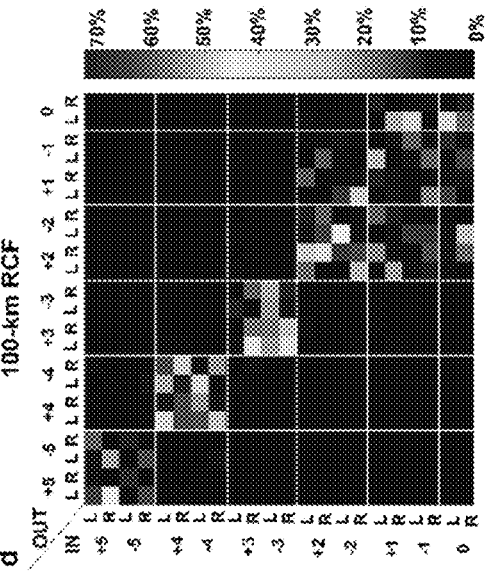

As shown in FIG. 11, which is the experimental result of measuring different optical fiber transmission matrices using the device in the embodiment (b) in FIG. 3 provided by the disclosure, the specific implementation method is as follows:

Starting from the drawing (a) to the drawing (e) in FIG. 11, the measured intensity transmission matrices of 5 m air core optical fiber, 5 m ring core optical fiber, 2 km ring core optical fiber, and the intensity transmission matrix and phase transmission matrix of 100 km ring core optical fiber are shown respectively.

It will be easily understood by persons skilled in the art that the above description is only preferred embodiments of the disclosure and the embodiments are not intended to limit the disclosure. Any modifications, equivalent substitutions, and improvements made within the spirit and principles of the disclosure should be included in the protection scope of the disclosure.

What is claimed is:

1. A method of rapid measurement of an ultra-long distance optical fiber transmission matrix configured to measure transmission matrices of N modes, wherein N is a positive integer, and comprising steps as follows:

using any one of the N modes as a input mode, preprocessing a light beam of the input mode to obtain a field distribution of its output light field, wherein the preprocessing comprises: coupling the light beam into an optical fiber to be measured, and after being transmitted through the optical fiber to be measured, splitting an output light beam of the optical fiber to be measured into two paths, wherein one of the paths is a signal light, and the other one of the paths is a reference light; detecting an intensity of the signal light and feeding back to the reference light; converting the reference path into a reference light with uniform phasefront, limiting the reference light to a preset polarization, and adjusting a power ratio of the signal light to the reference light according to the intensity of the signal light to ensure interference contrast; combining the reference light and the signal light, wherein the reference light interferes with the signal light, and splitting an interference light obtained into two paths of polarized light beams, wherein the two paths of polarized light beams are imaged to obtain a first interference pattern and a second interference pattern respectively, and reconstructing the field distribution of the output light field of the light beam based on the first interference pattern and the second interference pattern;

subjecting sequentially the laser beam to polarization control and mode control to be controlled into the other N−1 modes other than the initial input mode, and preprocessing the N−1 modes other than the initial input mode respectively to obtain field distributions of output light fields of the N−1 modes;

calculating weight coefficients of the N modes according to the field distributions of the output light fields of the initial input mode and the N−1 modes, and thus the N rows of a transmission matrix of the optical fiber can be measured;

superimposing any mode other than the initial input mode to the initial input mode to obtain their superimposed modes, then coupling it into the optical fiber and dealing it with the preprocessing, so that the field distribution of the output light field of such superimposed modes can be reconstructed; calculating a phase difference between the field distributions of the respective superimposed modes and the initial input mode, and obtaining initial phase differences between different rows according to the calculated phase differences to determine an arrangement of the N rows, thereby obtaining the full transmission matrix of the optical fiber to be measured.

2. The method of rapid measurement of the ultra-long distance optical fiber transmission matrix according to claim 1, wherein the reference light is converted into the reference light with uniform phase by spatial filtering.

3. The method of rapid measurement of the ultra-long distance optical fiber transmission matrix according to claim 2, wherein the reference light is converted into the reference light with uniform phase, the reference light is limited to the preset polarization, and the preset polarization is 45°.

4. The method of rapid measurement of the ultra-long distance optical fiber transmission matrix according to claim 1, wherein the polarization control is implemented by piezoelectric polarization modulation or electro-optic polarization modulation; the mode control is implemented by controlling two-dimensional phase and amplitude distribution of the light field; the limiting the reference light to the preset polarization is implemented by piezoelectric control, lithium niobate polarization control, lithium niobate film polarization control, or silicon-based polarization control.

5. A device of rapid measurement of an ultra-long distance optical fiber transmission matrix, comprising: a laser, a control module, a pre-processing module, and a processor, wherein the control module is configured to perform polarization control and mode control on the initial input mode generated by the laser to obtain N−1 modes other than the initial input mode;

wherein the preprocessing module comprises an objective lens, an optical fiber to be measured, a beam splitter, a reference light obtaining module, a first power matching module, a polarization tracking module, a second power matching module, a beam combiner, a polarization beam splitter, and a camera; the light beam is coupled to the optical fiber to be measured through the objective lens and split into two paths by the beam splitter after being transmitted through the optical fiber to be measured, wherein one of the paths is a signal light, and the other one of the paths is a reference light; the first power matching module is configured to detect an intensity of the signal light and feed back to the reference light; the reference light obtaining module is configured to convert the reference light into a reference light with uniform phase, the polarization tracking module is configured to limit the reference light to a preset polarization, and the second power matching module is configured to adjust a power ratio of the signal light to the reference light according to the intensity of the signal light fed back to ensure interference contrast; the reference light and the signal light are combined by the beam combiner, interference occurs, an interference light is obtained, the interference light is split into two paths of polarized light beams by the polarization beam splitter, the two paths of polarized light beams are imaged by the camera to obtain a first interference pattern and a second interference pattern respectively, and the field distribution of the output light field of the light beam is reconstructed based on the first interference pattern and the second interference pattern;

wherein the preprocessing module is configured to use any one of the N modes as a initial input mode, the light beam of the initial input mode is preprocessed to obtain the field distribution of the output light field of the initial input mode, and preprocessing is performed respectively on N−1 modes other than the initial input mode to obtain field distributions of output light fields of the N−1 modes; after any mode other than the initial input mode is superimposed to the initial input mode to obtain N−1 superimposed modes, the light beams thereof are respectively subjected to preprocessing to obtain field distributions of output light fields of the N−1 superimposed modes;

wherein the processor is configured to calculate weight coefficients of the N modes according to the field distributions of the output light fields of the initial input mode and the N−1 modes, and N rows of a transmission matrix of the optical fiber to be measured are obtained; and the phase difference between the field distributions of the respective superimposed modes and the initial input mode is calculated, weight coefficients of the respective superimposed modes are calculated according to the phase difference to obtain an initial phase difference between different rows to determine an arrangement of the N rows, thereby the full transmission matrix of the optical fiber to be measured is obtained.

6. The device of rapid measurement of the ultra-long distance optical fiber transmission matrix according to claim 5, wherein the reference light obtaining module comprises a multi-mode optical fiber and a single-mode optical fiber connected to each other, the multi-mode optical fiber is configured to couple the reference light, and the single-mode optical fiber is configured to perform spatial filtering on the reference light output by the multi-mode optical fiber to obtain a Gaussian light beam.

7. The device of rapid measurement of the ultra-long distance optical fiber transmission matrix according to claim 6, wherein the reference light obtaining module further comprises an optical fiber perturbation module disposed on the multi-mode optical fiber and configured to ensure that optical power in the single-mode optical fiber is not zero by perturbation when no light enters the single-mode optical fiber from the multi-mode optical fiber; the optical fiber perturbation module is a piezoelectric ceramic tube or a piezoelectric dual-chip perturbation device.

8. The device of rapid measurement of the ultra-long distance optical fiber transmission matrix according to claim 5, wherein the polarization control module is a piezoelectric polarization controller or an electro-optic polarization modulator; the control module is a digital micromirror device or a spatial light modulator; the polarization tracking module is a piezoelectric polarization controller, a lithium niobate polarization modulator, a thin-film lithium niobate polarization modulator, or a silicon-based polarization modulator; the second power matching module is an optical amplifier and an optical attenuator working in an automatically power controlling mode APC.

* * * * *